June 12, 1934.   J. P. GROSET ET AL   1,962,144
MACHINE FOR MAKING WAFERS
Filed April 28, 1932   3 Sheets-Sheet 2

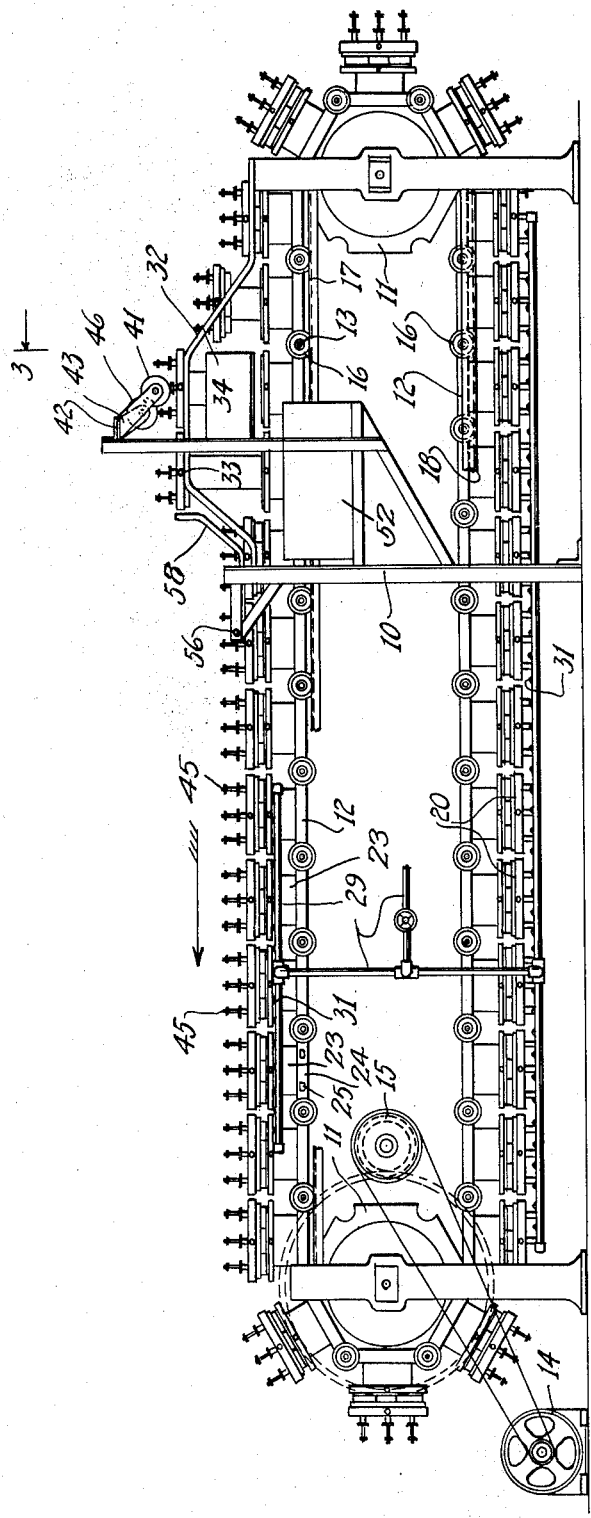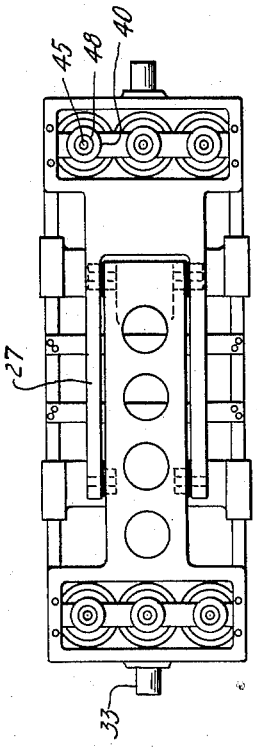

INVENTORS:
John P. Groset
Christ J. Halset
By E. J. Andrews
Atty.

June 12, 1934.   J. P. GROSET ET AL   1,962,144
MACHINE FOR MAKING WAFERS
Filed April 28, 1932   3 Sheets-Sheet 3

INVENTORS:
John P. Groset
Christ J. Halset
By E. J. Andrews
Atty.

Patented June 12, 1934

1,962,144

UNITED STATES PATENT OFFICE 1,962,144

MACHINE FOR MAKING WAFERS

John P. Groset and Christ J. Halset, Chicago, Ill., assignors, by mesne assignments, to Ideal Machine Company, Chicago, Ill., a corporation of Illinois Application April 28, 1932, Serial No. 607,948

3 Claims. (Cl. 107—58)

This invention relates to machines for making wafers, other pastry products, and the like. It has for one of its objects providing a machine of this nature that is operated by chain belts along horizontal paths. Another object is to provide a double system; that is, the machine has two systems of molds operating in parallel with each other, arranged so that either system or both may be used if desired; and each of the systems is composed of a series of independent units arranged so that any of the units may be removed without interfering with the operation of the other units. Another object is to provide for opening and closing the corresponding molds in the two systems simultaneously and in an improved manner. Another object is to provide improved molds for the pastry. Other objects of the invention will be apparent from a consideration of the accompanying drawings and the following description thereof.

Figure 3:
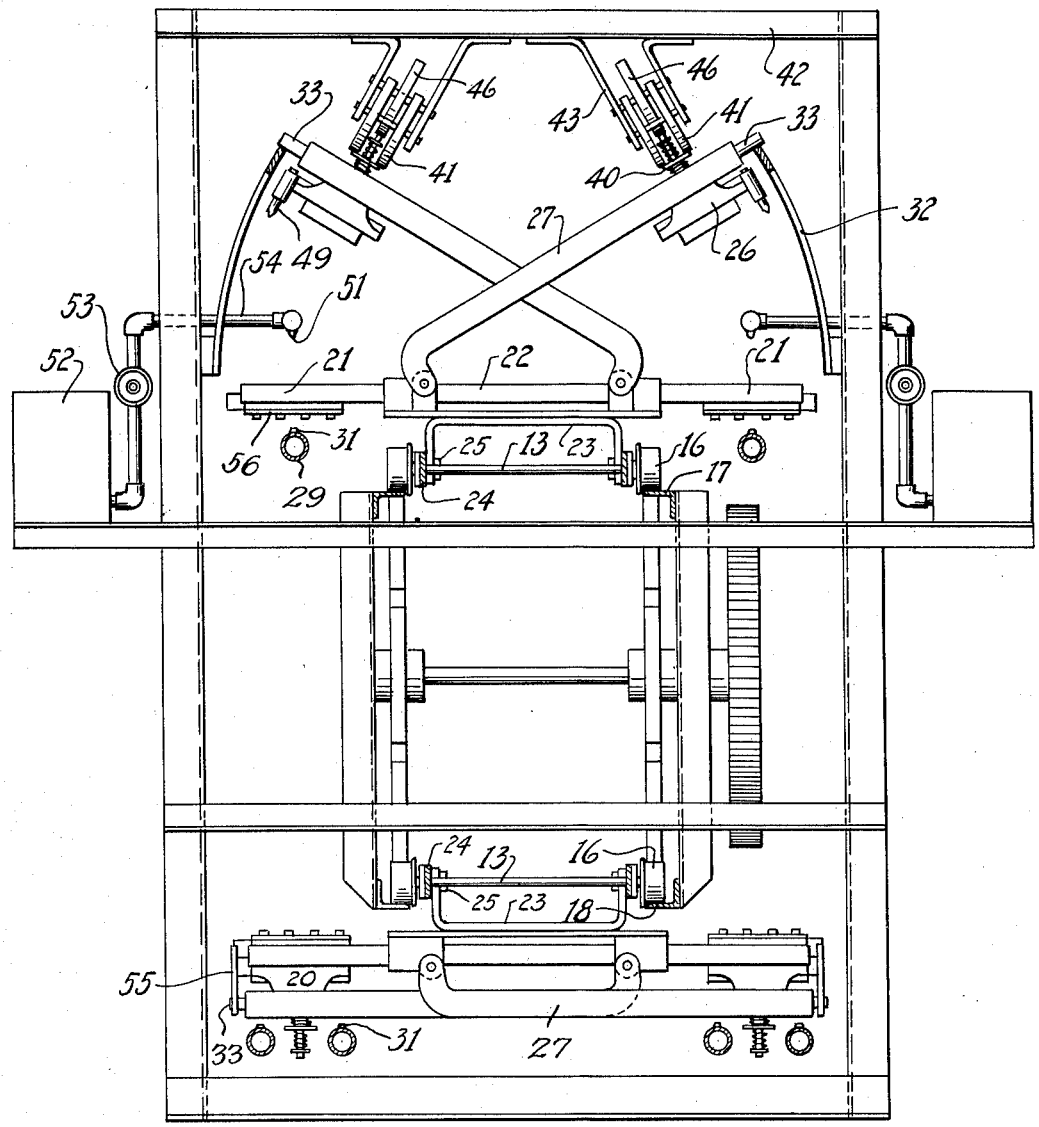
Figure 8:
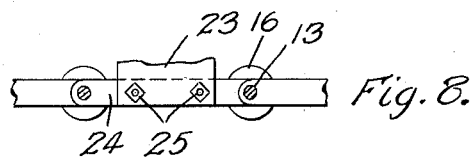
Figure 9:
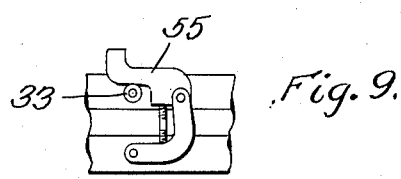
Figure 4:
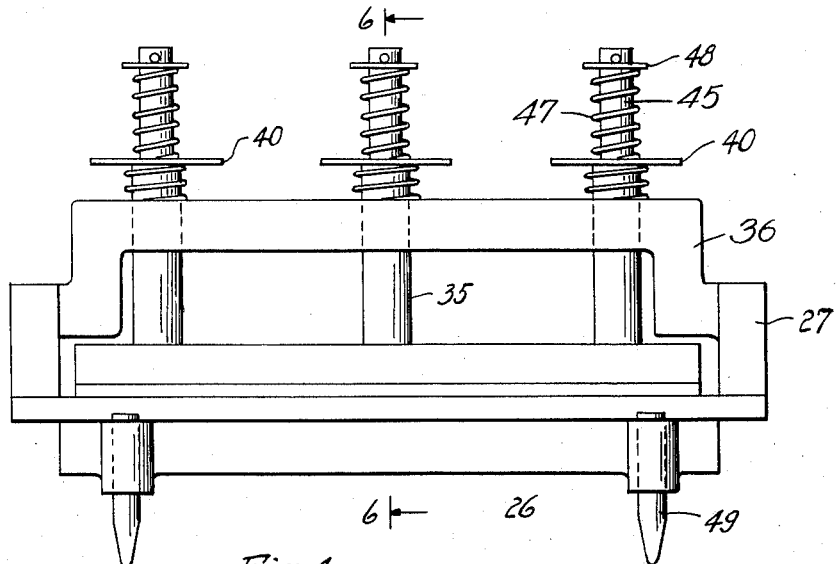
Figure 7:
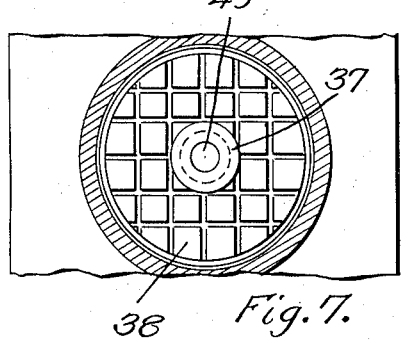
Figure 5:
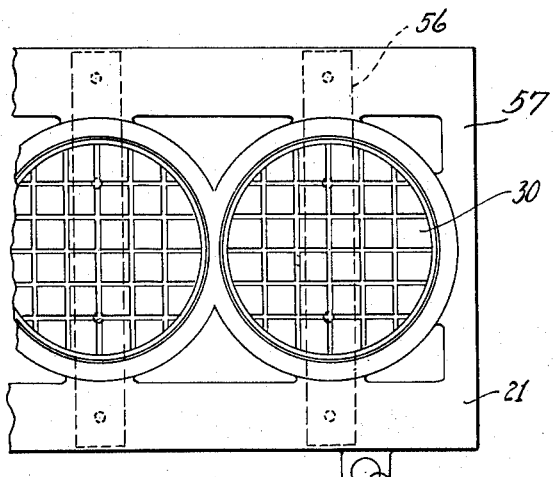
Figure 6:
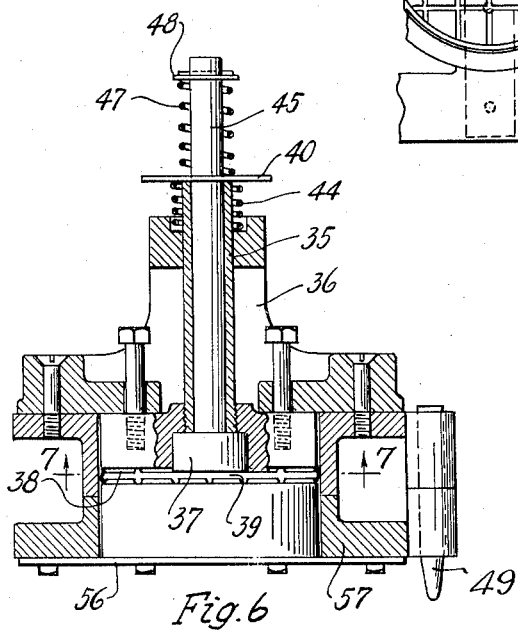

Of the drawings, Fig. 1 is an elevation of a machine which embodies the features of our invention, but shows only general features without much detail; Fig. 2 is an enlarged plan view of one of the double mold units; Fig. 3 is an enlarged view along the line 3—3 of Fig. 1; Fig. 4 is an enlarged elevation of an upper mold section for forming the wafers; Fig. 5 is a fragmental plan view of a lower mold section; Fig. 6 is a sectional view along the line 6—6 of Fig. 4; Fig. 7 is a face view of the upper mold plate of a molding unit along the line 7—7 of Fig. 6; Fig. 8 is a fractional view showing how the units are connected to the belt links; and Fig. 9 is an elevation of a hook used to clamp together the members of the molding units.

The machine comprises a frame 10, Fig. 1, on each end of which are rotatably mounted two chain belt pulleys 11, by means of which are operated the chain belts 12. The belts are connected by shafts 13, Fig. 2, and are operated by any suitable means, such as an electric motor 14 operating the wheel 15 which operates one of the pulleys 11. The upper sides of the belts as they are rotated are supported by means of rollers 16 on rails 17, and the lower sides of the belts are supported by the rollers 16 on rails 18.

The machine comprises also molding units 20 which consist of two sections. The sections 21, Fig. 2 are fixed to cross beams 22, one on each side of the sections 21.

These beams are fixed to the chain belt by means of bars 23, the bars extending from one chain belt to the other and being fixed to the links 24 of the belts by means of bolts 25. These double units are entirely independent of each other and can be removed from the chain belt and from the machine merely by removing the bolts 25. In this manner, each unit may be removed whenever desired, for any purpose.

The upper sections 26 of the molding units are pivotally associated with the bars 22 by means of bars 27. In this manner, the two sections may be separated by elevating the upper sections as hereinafter described. Also, the upper sections, as well as the lower sections, of the units may be removed from the machine by simply removing the bolts 25.

In operation, the upper portion of the chain belt is carried along in the direction of the arrow, Fig. 1, and the batter which has been passed on to the plates 30 of the lower mold sections is cooked by means of the gas jets 31 supplied with gas by means of the pipes 29. The molds in this manner are sufficiently heated to properly bake the batter by the time the mold units have arrived at the right-hand end of the machine. These units are then passed upwardly and the upper sections are then elevated from the lower sections.

At the outer ends of each of the bars 27 is a roller 33. These rollers pass upon the tracks 32 as the molds move forwardly, and the upper sections are thus elevated as indicated in Fig. 1.

When in the position 34, with the upper sections elevated to the highest position, the wafers are forced out of the mold section by means of a tube 35 slidably mounted in the frame 36 of the upper mold section. Fixed to the lower end of the tube is a plunger 37 which forms a portion of the upper mold surface and is adapted to press against the wafer 39 and force it off from the mold surface 38. This plunger is operated by means of the tube 35 and a ring 40 fixed to the upper end of the tube. A pair of rollers 41 are rotatably mounted on a frame 42 by means of a bracket 43. As the mold section reaches the position 34, these rollers force the ring 40 downwardly, carrying with it the tube 35 and the plunger 37, thus forcing the wafer out from the mold section. As the ring 40 passes the rollers 41, the spring 44 forces the ring 40 and the plunger 37 upwardly to the normal position.

To prevent the wafer from sticking to the plunger 37, means are provided for forcing it off from the plunger. These means comprise a rod 45 slidably mounted in the tube 35 and passing through the plunger 37, the lower end of the rod being normally flush with the lower end of the plunger. As the mold section moves onwardly beyond the position 34, a wheel 46, rotatably mounted in the bracket 43, forces the rod 45 downwardly, thus forcing the wafer away from the face of the plunger. When the rod 45 passes beyond the wheel 46, a spring 47, acting on the ring 48, forces the rod 45 upwardly to its normal position. In this manner, the wafer is forced entirely free from the mold section, and the wafer drops downwardly and is disposed of in any suitable manner.

As the mold unit passes onwardly with the upper mold section elevated, the lower section passes under the jet 51 from which is forced a suitable amount of batter for another wafer. The batter is contained in tanks 52, one on each side of the machine and, by means of pumps 53, the batter is forced through the pipes 54 to the jets.

In this particular instance, I have illustrated three molding plates 30 for each of the mold units. These plates are positioned in rows parallel with the path of motion of the units, and the means for removing the wafers from the surface of the upper mold sections pass successively under the wheels 41 and 46, thus forcing the wafer successively from the surfaces; and, similarly, the lower mold plates are passed successively under the jet 51. Inasmuch as the plates 30 in the same units are positioned in contact with each other, and, as the units themselves are spaced but a slight distance apart, the jet 51 on each side of the machine can be continuously delivering the batter without any appreciable amount of waste.

As the molds pass onwardly after the batter has been passed onto the lower sections, the rails 32 allow the upper sections to pass downwardly onto the lower sections; and to insure the passage downwardly of the upper section, and to press this section against the batter on the lower section, the rail 58 is provided which, acting on the rollers 33, forces the upper section down against the batter on the lower section. The upper sections are accurately registered with the lower sections by means of pins 49 which enter holes 50 in the lower sections.

When the two sections are thus pressed together, they are locked in position by any suitable means, such as by means of the hooks 55. When the two sections are pressed and locked together, it is desirable to have some yielding means for inequalities in the batter thickness, or for other reasons. For this purpose, I provide resilient means, preferably the spring strips 56 which pass under the frame piece 57 and the mold member 30, being bolted to each. This allows sufficient yielding of the members 30 and, at the same time, holds these members accurately in position in the frame pieces 57.

We claim as our invention:

1. In a baking machine, two coacting mold sections and means for pressing baked pastry from one section, said means comprising a plunger slidably mounted in the section, and means for pressing the pastry off from the plunger, said latter means being slidably mounted in said plunger, means for operating the plunger and the latter means, said operating means comprising two actuating surfaces, and means for moving relatively the plunger and the surfaces.

2. In a baking machine as claimed in claim 1, one of the surfaces being arranged to act before the other.

3. In a baking machine, two coacting mold sections, means for forcing baked pastry off from one section, said means comprising a plunger movably mounted in the section and having its outer surface substantially flush with the molding surface of the section, a stem fixed to the plunger and projecting through the mold section, means for pressing said stem towards the molding surface, and means for pressing the pastry off from the plunger.

JOHN P. GROSET.
CHRIST J. HALSET.